(12) United States Patent
Nambair et al.

(10) Patent No.: US 10,346,731 B2
(45) Date of Patent: Jul. 9, 2019

(54) METHOD AND APPARATUS FOR DYNAMIC INTERCHANGE PRICING

(71) Applicant: MasterCard International Incorporated, Purchase, NY (US)

(72) Inventors: Anant Nambair, Larchmont, NY (US); James Carrington, Larchmont, NY (US); Denise Torreyson, Elmsford, NY (US); Steven J. Jonas, Westport, CT (US)

(73) Assignee: Mastercard International Incorporated, Puchase, NY (US)

( * ) Notice: Subject to any disclaimer, the term of this patent is extended or adjusted under 35 U.S.C. 154(b) by 177 days.

(21) Appl. No.: 15/677,350

(22) Filed: Aug. 15, 2017

(65) Prior Publication Data
US 2017/0364780 A1    Dec. 21, 2017

Related U.S. Application Data

(63) Continuation of application No. 12/574,822, filed on Oct. 7, 2009, now abandoned.
(Continued)

(51) Int. Cl.
*G06Q 30/02* (2012.01)
*G06K 15/02* (2006.01)
(Continued)

(52) U.S. Cl.
CPC ......... *G06K 15/1882* (2013.01); *G06Q 20/04* (2013.01); *G06Q 20/24* (2013.01);
(Continued)

(58) Field of Classification Search
CPC .......... G06Q 30/0213; G06Q 30/0274; G06Q 2250/10; G06Q 20/405
See application file for complete search history.

(56) References Cited

U.S. PATENT DOCUMENTS 7,069,244 B2 *  6/2006  Strayer ................. G06Q 20/04
                                                             705/35
7,536,349 B1 *  5/2009  Mik ....................... G06Q 20/04
                                                              705/2

(Continued)

*Primary Examiner* — A. Hunter Wilder
(74) *Attorney, Agent, or Firm* — Buckley, Maschoff & Talwalkar LLC

(57) ABSTRACT

Methods and systems for dynamically determining interchange fees. In an embodiment, an acquirer computer transmits a payment card account authorization request to a payment processing network, and receives an authorization response authorizing the transaction and comprising a spending history indication reflecting a compilation of spending history data of a group of payment card accounts that qualify for dynamic interchange rate setting. The acquirer computer then stores the spending history indication, transmits the authorization response to a merchant processing system computer, receives a clearing file from the merchant processing system computer, determines that an interchange rate depends on the spending history indication, selects an interchange rate from an interchange rate selection database based on the spending history indication, calculates an interchange fee based on the interchange rate, and transmits the clearing file and the interchange fee to the payment network for clearing of the transaction.

12 Claims, 7 Drawing Sheets

Related U.S. Application Data

(60) Provisional application No. 61/103,279, filed on Oct. 7, 2008.

(51) Int. Cl.
  *G06Q 20/04* (2012.01)
  *G06Q 20/24* (2012.01)
  *G06Q 20/40* (2012.01)
  *G06Q 40/00* (2012.01)

(52) U.S. Cl.
  CPC ......... *G06Q 20/40* (2013.01); *G06Q 20/4016* (2013.01); *G06Q 30/02* (2013.01); *G06Q 30/0283* (2013.01); *G06Q 40/12* (2013.12); *G06Q 20/405* (2013.01); *G06Q 30/0213* (2013.01); *G06Q 2250/10* (2013.01)

(56) References Cited

U.S. PATENT DOCUMENTS

| | | | | |
|---|---|---|---|---|
| 7,624,068 B1 * | 11/2009 | Heasley | ................ | G06Q 20/10 705/38 |
| 2002/0120584 A1 * | 8/2002 | Hogan | ................... | G06Q 20/02 705/67 |
| 2004/0088238 A1 * | 5/2004 | Gilson | ................... | G06Q 30/04 705/35 |
| 2004/0267673 A1 * | 12/2004 | Ballard | ................ | G06Q 20/02 705/77 |
| 2005/0027648 A1 * | 2/2005 | Knowles | ................ | G06Q 20/04 705/38 |
| 2005/0119942 A1 * | 6/2005 | Horrocks | ............ | G06Q 10/087 705/26.82 |
| 2005/0149455 A1 * | 7/2005 | Bruesewitz | ............ | G06Q 20/04 705/64 |
| 2006/0111980 A1 * | 5/2006 | Sullivan | ................ | G06Q 20/10 705/14.21 |
| 2006/0149671 A1 * | 7/2006 | Nix | ........................ | G06Q 20/04 705/40 |
| 2007/0100691 A1 * | 5/2007 | Patterson | ............... | G06Q 20/40 705/14.14 |
| 2007/0124238 A1 * | 5/2007 | Hogg | .................... | G06Q 20/04 705/38 |
| 2008/0052229 A1 * | 2/2008 | Sheinker | ............... | G06Q 20/10 705/40 |

* cited by examiner

METHOD AND APPARATUS FOR DYNAMIC INTERCHANGE PRICING

CROSS-REFERENCE TO RELATED APPLICATIONS

This application claims the benefit of U.S. Provisional Patent Application No. 61/103,279, filed on Oct. 7, 2008, and to U.S. patent application Ser. No. 12/574,822 filed on Oct. 7, 2009, which applications are incorporated herein by reference.

BACKGROUND

Embodiments disclosed herein relate to payment systems. In particular, some embodiments relate to methods, apparatus, systems, means and computer program products for dynamic interchange pricing in a payment processing network.

Payment cards are frequently used to pay for goods and services. One of the best known payment card systems is operated by MasterCard International Incorporated, which is the assignee hereof. As is very well known, cardholders present payment cards at point of sale terminals, or otherwise provide their payment card account numbers to merchants, in order to pay for purchase transactions.

Payment cards are issued by financial institutions such as banks to individual cardholders and to businesses and other entities. These financial institutions are referred to as issuers. The issuers of the payment cards maintain the payment card accounts of the cardholders.

Another class of participants in a payment card system is referred to as the "acquirers". These are financial institutions which have relationships with merchants who accept payment cards in as payment for transactions entered into by cardholders. Acquirers in substance serve as the merchants' point of contact with the payment card system. To initiate transactions in the payment card system, merchants accept payment cards and transmit authorization requests to acquirers.

The operator of the payment card system (e.g., the assignee hereof) is sometimes referred to as the "payment card system operator" or just the "operator". The payment card system operator operates a payment processing system that receives authorization requests for purchase transactions from the acquirers and routes the requests to the issuers of the payment cards. An example of a payment processing system is the "Banknet" system, which is operated by the assignee hereof. The payment card system operator also operates a clearing system by which settlement of transactions occurs between issuers and acquirers.

One aspect of a typical payment card system is referred to as "interchange". An interchange fee is a small fee paid by the acquirer to the issuer with respect to a particular transaction. The purpose of the interchange fee is to compensate the issuer for a portion of the risks and costs it incurs. Interchange rates/fees are only one of the many cost components of the "merchant discount rates" that are established by acquirers and paid by merchants in exchange for card acceptance services provided by acquirers to merchants.

Interchange rates may in some cases be established on the basis of a bilateral agreement between an issuing bank and an acquiring bank. However, for many transactions in a payment card system, the interchange fee for a particular transaction is based on a "default" interchange rate established by the payment card system operator. Such interchange rates are "default" in the sense that they apply in the absence of a bilateral agreement between the issuer and the acquirer bank.

Interchange fees are a necessary and efficient method for maintaining a strong and vibrant payment card system. Setting interchange rates is a challenging proposition that involves an extremely delicate balance. If interchange rates are set too high, such that they lead to disproportionately high merchant discount rates, then merchants' desire and demand to accept a particular brand of payment card may be reduced. However, if interchange rates are set too low, then issuers' willingness to issue and promote the brand of payment cards will be reduced, and cardholders' demand for the brand of payment cards will also be reduced. In response to these competitive forces, a payment card system operator may strive to maximize the value of the payment card system (including total dollars spent with the system's cards, the number and types of cards in circulation, and the number and types of merchants accepting the system's cards) by setting default interchange rates at levels that balance the benefits and costs to both cardholders and merchants.

In a typical arrangement, the payment card system operator publishes interchange rates that apply to various categories of transactions. During the process of clearing the transactions, the acquirers determine which rates apply to the transactions based on information about the transactions received from the merchants.

A published set of interchange rates may apply, for example, to transactions submitted by merchants in the United States and charged to payment card accounts issued in the United States. Another set of interchange rates may apply to transactions submitted by merchants in the United States and charged to payment card accounts issued outside of the United States. Similarly, other sets of interchange rates may apply to transactions submitted by merchants in other countries, based on payment card accounts issued in those countries or outside of those countries.

Interchange rate tables may be organized by the type of card product under which the payment card account is issued. Each interchange rate may have a series of requirements, all of which must be satisfied in order for a transaction to qualify for that rate. The requirements may include such factors as: merchant category; the time between authorization and clearing; the presence or absence of magnetic stripe data; the submission of enhanced transaction data; and a merchant's sales and transaction volume in the payment card system. In some cases the transaction amount for the particular transaction must be above or below a particular transaction amount threshold for the transaction to qualify for a particular interchange rate.

Examples of merchant categories are restaurant, airline, vehicle rental, convenience stores, and fuel dispenser. There are many other merchant categories in use for establishing interchange rates.

Typically an interchange rate is composed of one or both of two components, namely a percentage of the transaction amount and a flat per transaction charge. A typical percentage amount for an interchange rate may be in the range of 1.5% or 2.0% (although higher or lower percentage amounts may apply in some cases). A typical flat per transaction charge may be $0.05 to $0.10. Thus, for example, certain transactions may qualify for an interchange rate of 1.55%+$0.10, whereas other transactions may qualify for an interchange rate of 1.90%+$0.05. Many other combinations of percentage plus flat fee are in use. A percentage alone without flat fee is also applicable to some categories of transactions. Also, for example, some interchange rates may simply be a flat fee such as $0.75. For some categories, an interchange rate that includes a percentage (with or without a flat charge component) may be subject to a minimum fee floor and/or a maximum fee ceiling per transaction.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, embodiments relate to payment card systems in which an interchange fee is assessed to transactions. In previous systems, to the extent that interchange rates were based on the identity of the payment card account, the interchange rates were based on static attributes, such as the type of card product issued for that account. Embodiments of the present invention introduce systems and methods for determining and assessing dynamic interchange fees based on, for example, payment card account spending history.

Figure 1:
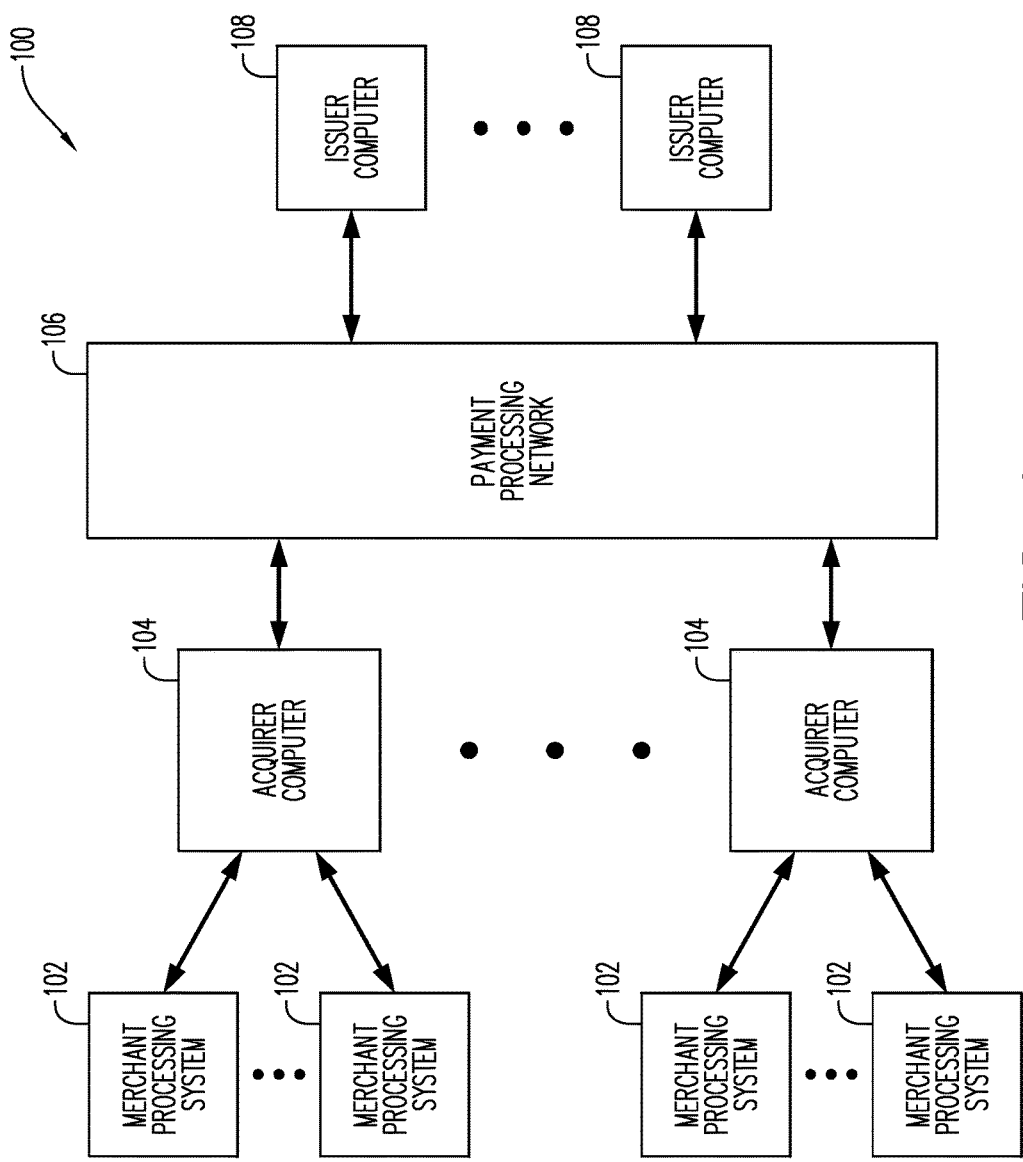
FIG. 1 is a block diagram that illustrates a payment card system in which the present invention may be applied.

FIG. 1 is a block diagram that illustrates a payment card system 100 in which the present invention may be applied.

The payment card system 100 includes numerous merchant processing systems 102. Each merchant processing system 102 is a computer or computer system that receives transaction data from the POS locations (indicated by reference numerals 202 in FIG. 2) connected to it and that forwards authorization requests and requests to settle purchase transactions to an acquirer computer 104. In the case of an internet shopping site, the POS location(s) and the merchant processing system may be integrated together into a single computer system. In some cases (not illustrated), the POS location 202 may communicate directly with an acquirer computer 104, without an intervening merchant processing system.

The term "acquirer" is widely used in the payment processing field, and refers to financial institutions such as banks or other financial systems that have agreements with merchants to receive and forward authorization and settlement messages in connection with payment card payments received by those the merchants. The term "acquirer" also refers to processing agents that act on behalf of such financial institutions or systems. Each acquirer typically serves numerous merchants, and accordingly each acquirer computer 104 is shown as being in communication with numerous merchant processing systems 102. Moreover, a typical payment card system involves numerous acquirers, and FIG. 1 therefore schematically shows numerous acquirer computers 104.

Figure 2:
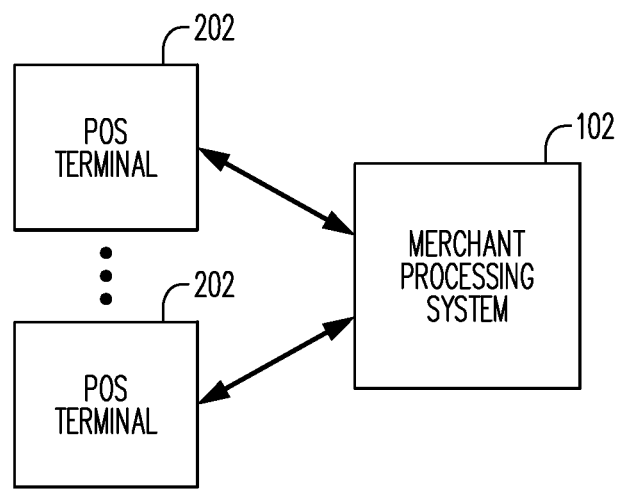
FIG. 2 is a block diagram that illustrates additional details of the payment card system of FIG. 1.

As will be understood from FIGS. 1 and 2, taken together, the payment card system 100 includes numerous POS locations 202 (FIG. 2). The term "POS location" refers to "points of transaction" such as internet commerce sites that receive payment account numbers from customers who shop online, mail order or telephone (MOTO) merchants who receive payment account numbers by telephone and/or mail, merchants who submit recurring payments pursuant to agreements with cardholders and physical point of sale terminals located in brick-and-mortar retail stores. In the case of physical point of sale terminals, a payment card (not shown; e.g., a credit card, debit card, charge card, stored value card, or a corporate card or fleet card) is presented at the terminal by a customer and read by the terminal to input, among other things, the number of the payment card account to which a purchase transaction is to be charged. In the case of other types of POS location, the payment card account number is input into the POS location by human data entry or other means.

In addition to the acquirer computers 104, the payment card system 100 includes a payment processing network 106, such as the above-mentioned Banknet system. The payment processing network 106 is constituted by one or more computers operated by the payment card association, and related data communication facilities (not separately shown). The payment processing network 106 is in communication, at least from time to time, with the acquirer computers 104. The payment processing network 106 receives transaction authorization requests from acquirers and passes the authorization requests to issuers of payment cards. The payment processing network 106 also returns authorization responses to the acquirers from the issuers.

The payment card system operator may also operate a transaction clearing system, such as the well known Global Clearing Management System (GCMS), also operated by the assignee hereof. The transaction clearing system is not shown apart from the payment processing network 106. The transaction clearing system, like the payment processing network 106, may be constituted by one or more computers operated by, and associated communication facilities commissioned by, the payment card system operator. The transaction clearing system receives purchase transaction clearing requests, typically in batches, from the acquirer computers 104. However, in an alternative embodiment, the payment card system operator computer(s) which handle(s) authorization requests and responses may be integrated with the transaction clearing system computer(s).

The above description relates primarily to a so-called "two message" system, in which an authorization request/response is later followed by a clearing message. However, payment card systems may also operate on a "one message" basis in which authorization and clearing are performed simultaneously in a single round of request and response.

FIG. 1 also shows, as part of the payment card system 100, issuer computers 108. Issuer computers 108 are operated by financial institutions that have issued the payment cards used by cardholders in connection with the payment card system 100. In the case of MasterCard International Incorporated, numerous issuers participate in the MasterCard payment card system, and accordingly numerous issuer computers 108 are schematically shown as being in communication with the payment processing network 106. As is well-known, the issuers maintain payment card accounts of the cardholders. Clearing messages received by the issuer computers 108 from the payment card system clearing system (not shown apart from payment processing network 106) indicate (typically in batches) transactions that are to be charged by the issuers to the cardholders' accounts.

Figure 3:
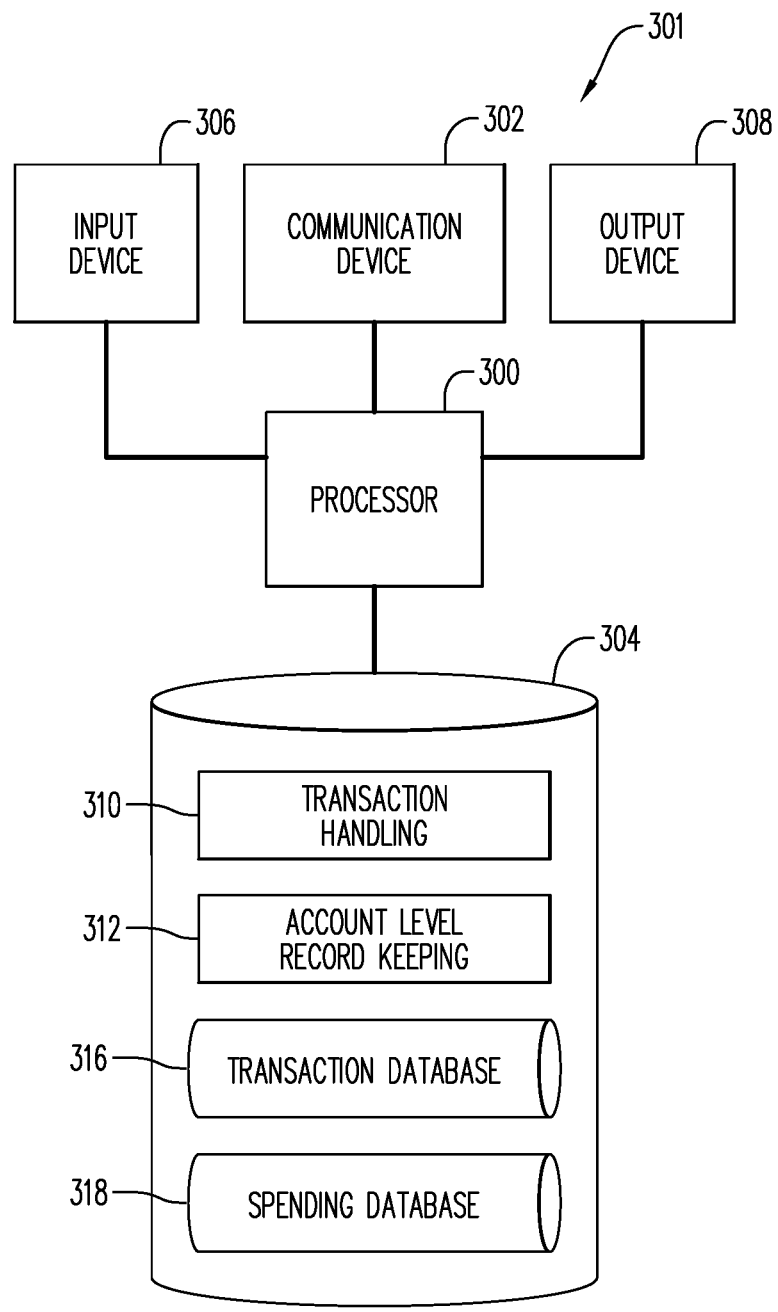
FIG. 3 is a simplified block diagram of a server computer that is operated by a payment card system operator as part of the system of FIG. 1.

FIG. 3 is a simplified block diagram of a server computer 301 that is operated by a payment card system operator as part of the payment card system 100. The server computer 301 (hereinafter referred to as a "payment card system operator computer") may in practice be constituted by one computer or two or more cooperating computers, and may perform functions normally provided by the payment card system operator in conjunction with a payment card system. From previous discussion it will be understood that these functions may include routing of authorization requests and authorization responses, and clearing of transactions in the payment card system 100. Further, and in accordance with aspects of the present invention, the payment card system operator computer 301 may perform functions related to accumulating spending history information and providing indications of such information to acquirers for use by the acquirers in determining what interchange rates are to be applied to purchase transactions in the payment card system 100.

The payment card system operator computer 301 may be conventional in its hardware aspects but may be controlled by software to cause it to operate in accordance with aspects of the present invention.

The payment card system operator computer 301 may include a computer processor 300 operatively coupled to a communication device 302, a storage device 304, an input device 306 and an output device 308.

The computer processor 300 may be constituted by one or more conventional processors. Processor 300 operates to execute processor-executable steps, contained in program instructions described below, so as to control the payment card system operator computer 301 to provide desired functionality. The program instructions may be referred to as computer readable program code means.

Communication device 302 may be used to facilitate communication with, for example, other devices (such as the acquirer computers 104 and the issuer computers 108 shown in FIG. 1).

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be referred to as a computer usable medium.

Storage device 304 stores one or more programs for controlling processor 300. The programs comprise program instructions that contain processor-executable process steps of payment card system operator computer 301, including, in some cases, process steps that constitute processes provided in accordance with principles of the present invention, as described in more detail below.

The programs may include an application 310 that programs the payment card system operator computer 301 to handle authorization requests and clearing for transactions in the payment card system 100. The payment card system operator computer 301 may handle the transactions generally in accordance with conventional practices, except that, in addition, the payment card system operator computer 301 may provide information elements to the acquirer computers 104 for use by the acquirer computers 104 in determining what interchange rates apply to the transactions.

In addition the programs stored in the storage device 304 may include an application 312 that programs the payment card system operator computer 301 to keep track—on an account-by-account basis—of purchase transactions performed in the payment card system 100 for each payment card account (or at least for each account in a subset of the payment card accounts).

Storage device 304 may also store a database 316 that contains data relating to transactions handled in the payment card system 100. In some embodiments, the transaction database may take the form of a data warehouse maintained in a separate computer (not separately shown) from the payment card system operator computer 301. The data warehouse may store, for each transaction cleared in the payment card system 100, information such as the transaction amount, the payment card account number for the payment card account to which the transaction was charged, and the merchant identifier (or at least merchant classification) for each transaction. In addition to this transaction information, the data warehouse/transaction database 316 may include any and all transaction data required for subsequent audit of the transactions cleared through the payment card system 100.

Another database that may be stored in the storage device 304 is a spending history database 318. The spending history database may contain account-by-account cumulative purchase information compiled by the account level record keeping program 312 from data stored in the transaction database/data warehouse 316.

There may also be stored in storage device 304 other unshown elements that may be necessary for operation of the payment card system operator computer 301, such as an operating system, a database management system, communication software, other applications, other data files, device drivers, etc.

Figure 4:
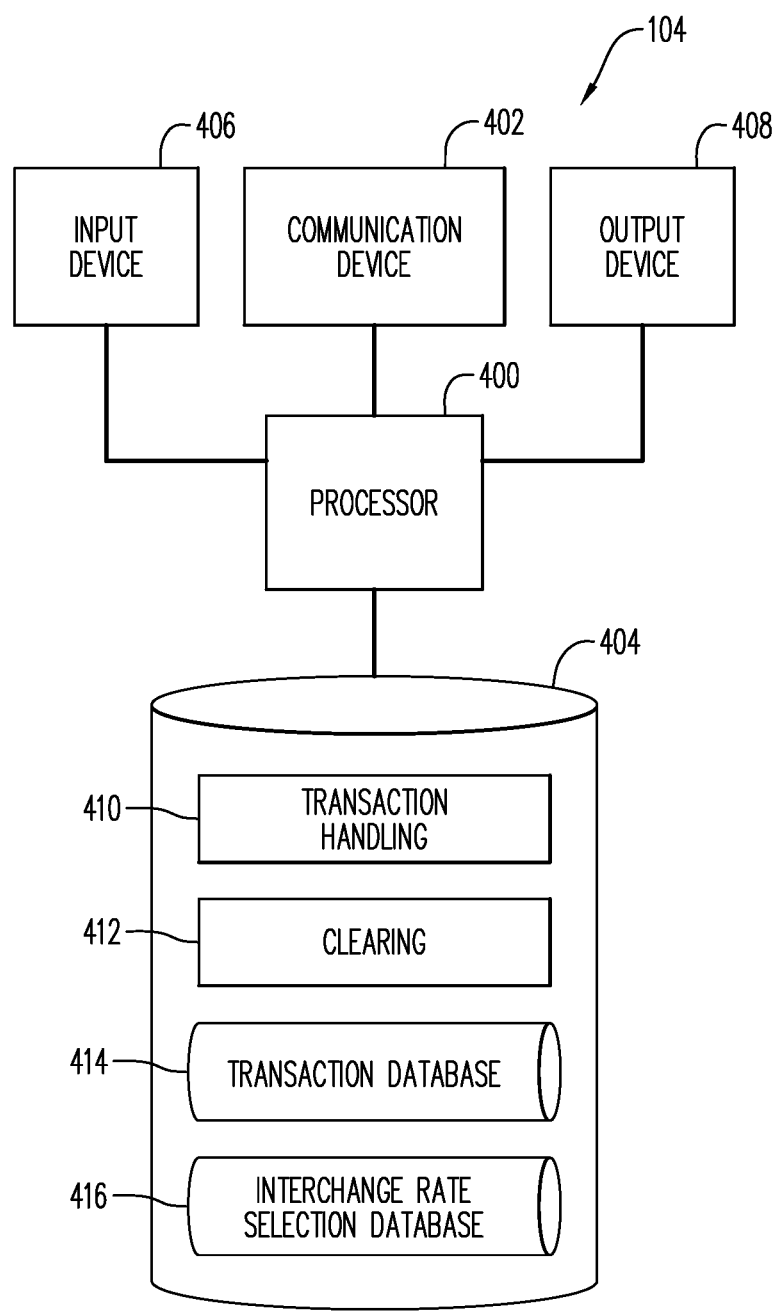
FIG. 4 is a simplified block diagram of a server computer that is operated by an acquirer as part of the system of FIG. 1.

FIG. 4 is a block diagram of a typical one of the acquirer computers 104 shown in FIG. 1.

The hardware architecture of the typical acquirer computer 104, as depicted in FIG. 4, may be conventional and may be the same as that of the payment card system operator computer 301. Thus, the above description of the hardware aspects of the payment card system operator computer 301 is equally applicable to the hardware aspects of the acquirer computer 104. Nevertheless, the following description is provided to summarize the hardware components of the acquirer computer 104.

The acquirer computer 104 may include a processor 400 that is in communication with a communication device 402, a storage device 404, an input device 406 and an output device 408. The storage device 404 may store an application program 410 that controls the acquirer computer 104 for purposes of handling transaction authorization requests received from merchant processing systems 102. As will be understood by those who are skilled in the art, the handling of authorization requests includes relaying of the authorization requests to the issuer computers 108 via the payment processing network 106. Also included in this function is receiving authorization responses that originated from the issuer computers 108 and that were received via the payment processing network 106, and relaying the authorization responses to the merchant processing systems 102. In general, the handling of authorization requests and responses by the acquirer computer 104 may be done in a conventional manner. But further, and in accordance with aspects of the present invention, the authorization responses, as received by the acquirer computer 104 from the payment processing network 106, may include—at least for some transactions—information (e.g., one or more data elements) that indicate a spending history status or classification for the payment card account to which the transaction is being charged. In accordance with aspects of the present invention, the acquirer computer 104 may store the information relating to spending history for subsequent use in determining what interchange rate applies for the transaction.

In addition, the storage device 404 may store an application program 412 which controls the acquirer computer 104 to handle clearing of transactions submitted (e.g., in batches) by the merchant processing systems 102. In part, the acquirer computer 104 may handle clearing transactions in a conventional manner. However, in other respects, and in particular in regard to determining interchange fees for transactions, the acquirer computer 104 may function in accordance with aspects of the present invention, by selecting the applicable interchange rate for the transaction based on account spending history, as described in more detail below in connection with FIGS. 7A and 7B.

Also stored in the storage device 404 is a transaction database 414, in which the acquirer computer 104 stores information relating to transactions handled by the acquirer computer 104. The transaction database may store, for example, the spending history indications provided by the payment processing network 106 (payment card system operator computer 301) in the form of the above-mentioned data element(s).

In addition, the storage device 404 may store a database 416 of interchange rates and the requirements for selection of the interchange rates for application to a particular transaction.

Moreover, the storage device 404 may store other programs, such as one or more operating systems, device drivers, web hosting software, communication software, etc., and may also store one or more other databases.

The other computers referred to above in connection with FIG. 1 may be conventional in terms of their hardware aspects and thus may be similar in hardware architecture to the payment card system operator computer 301 depicted in FIG. 3. Also, in at least some aspects of their operations, the components other than the payment card system operator computer 301 and the acquirer computers 104 may operate in a conventional manner for providing a payment card system.

Figure 5:
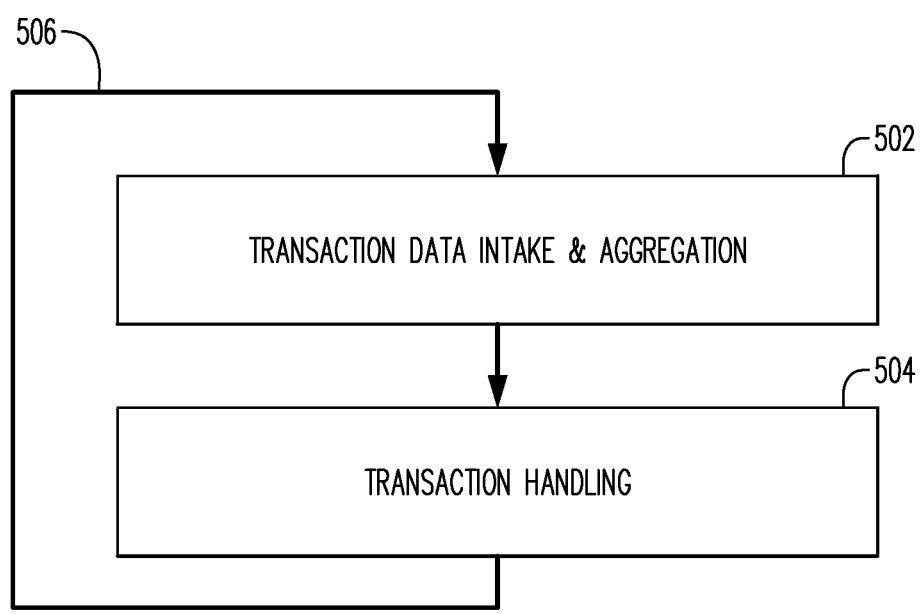
FIG. 5 is a flow chart that illustrates a process that may be performed in accordance with aspects of the present invention by the payment card system operator server computer of FIG. 3.

FIG. 5 is a flow chart that illustrates a process performed in accordance with aspects of the present invention by the payment card system operator computer 301.

At block 502, the payment card system operator computer 301 receives and stores data (e.g., transaction clearing data) relating to transactions handled in the payment card system 100. This data may, for example, be stored in the above-mentioned data warehouse/transaction database 316. In addition at block 502, the payment card system operator computer 301 processes and/or aggregates the transaction data on an account-by-account basis to generate spending history information for each payment card account in the payment card system 100 (or for each account in a group of payment card accounts for which dynamic interchange rate setting is to be applied).

In some embodiments, the compilation of spending history information is done for each payment card account of a certain card product type or one or more card product types issued by one or more issuers. For example, in some embodiments, only a certain type of premium card product, such as a "platinum" level credit card account, is made subject to dynamic interchange rate setting.

In some embodiments, the spending history compiled for a given payment card account that is subject to dynamic interchange rate setting consists simply of the total aggregate figure for purchases by the account during the last 12 months prior to the date on which the compilation was performed. In some embodiments, the compilation may be performed immediately prior to the beginning of each calendar quarter for the purpose of setting an interchange rate or rates for the particular payment card account for the ensuing calendar quarter.

In other embodiments, aggregate spending figures may also or alternatively be compiled each quarter for the prior 12 months for each of a number of different categories of merchant patronized by the cardholder, and/or for one or more specific merchants patronized by the cardholder.

In other embodiments, the spending history may be compiled for a time interval that is more or less than 12 months, and/or with a frequency that is greater or less than quarterly. For example, the spending history may be compiled for any period of 30 days or longer.

At 504 in FIG. 5, the payment card system operator computer 301 handles purchase transactions in the payment card system 100. This may entail conventional routing of authorization requests and responses between acquirer computers 104 and issuer computers 108. In addition, the payment card system operator computer 301 may look up the spending history status/classification for the payment card accounts in question, and may insert information accordingly in authorization responses for transmission to the acquirer computers 104, as described below in connection with FIG. 6.

As indicated by process flow path 506, purchase transaction data generated in connection with the transactions handled at step 504 is subject to being stored and periodically aggregated in future iterations of step 502, and step 504 may accordingly be reiterated as well.

Figure 6:
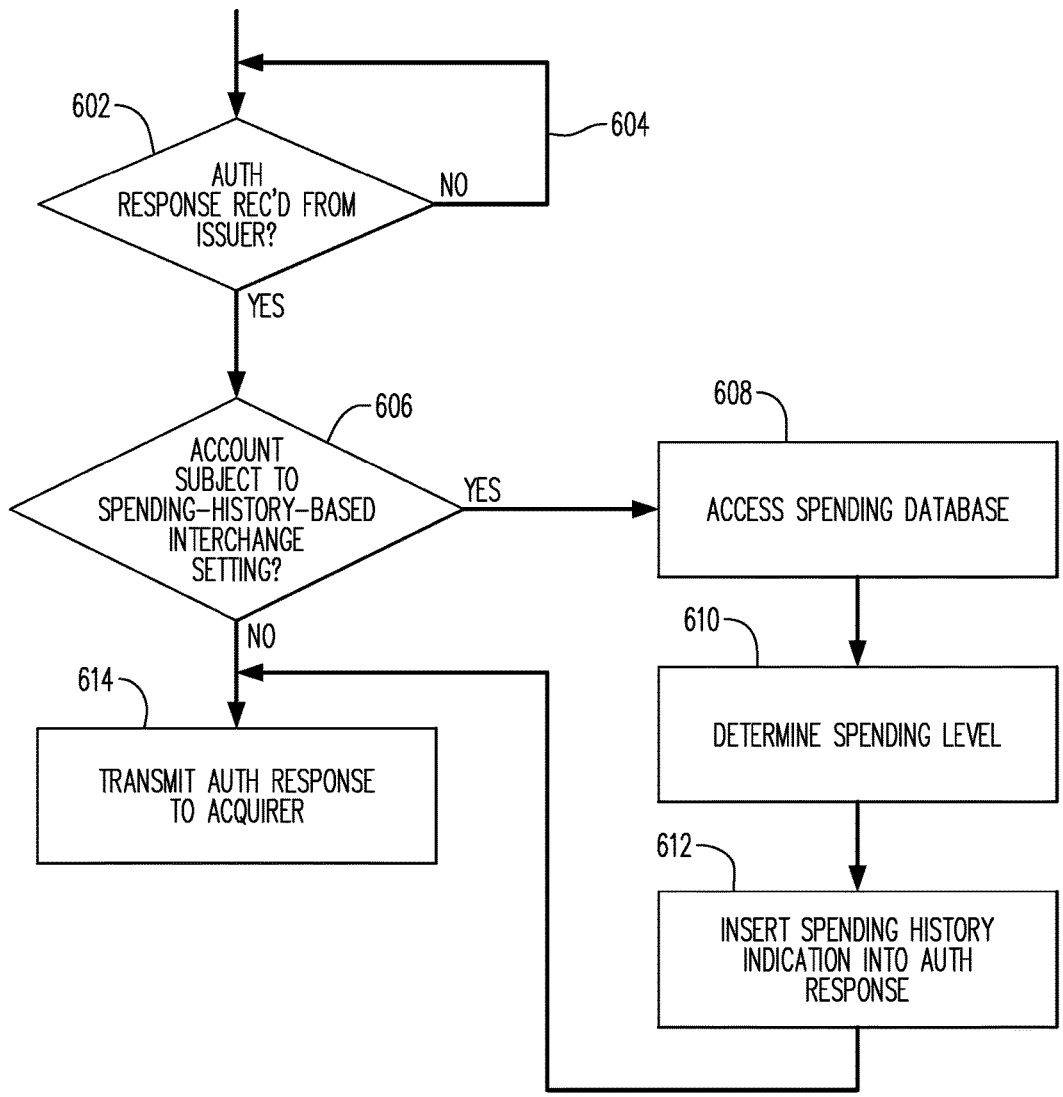
FIG. 6 is a flow chart that illustrates another process that may be performed in accordance with aspects of the present invention by the payment card system operator server computer of FIG. 3.

FIG. 6 is a flow chart that illustrates aspects of a transaction handling process that may be performed in accordance with aspects of the present invention by the payment card system operator computer 301.

At decision block 602 in FIG. 6, the payment card system operator computer 301 determines whether it has received an authorization response from an issuer computer 108. As will be understood by those who are skilled in the art, this may occur after the payment card system operator computer 301 had received an authorization request transmitted from an acquirer computer 104 and had routed the authorization request to the issuer computer 108. (The authorization request may have been in a conventional form, including the amount of the transaction and a payment card account number that identifies the payment card account to which the transaction is to be charged.) If no authorization response is received by the payment card system operator computer 301, then the process of FIG. 6 idles, as indicated by branch 604 from decision block 602. However, for present purposes it is assumed that the authorization response is received by the payment card system operator computer 301 (and it is further assumed that the authorization response indicates that the transaction has been authorized by the issuer). Based on these assumptions, the process of FIG. 6 advances from decision block 602 to decision block 606.

At decision block 606, the payment card system operator computer 301 determines whether the current transaction (i.e., the transaction which is the subject of the authorization response) is one for which selection of the interchange rate is dependent on the spending history associated with the payment card account to which the transaction is being charged. For example, in some embodiments, the payment card system operator computer 301 may make this determination based on a portion of the payment card account number which indicates the card product under which the account was issued. That is, according to an interchange rate structure that may be established by the payment card system operator, dynamic interchange rate setting, based on account spending history, may be applicable to one or more card product types sponsored by the payment card system operator. For accounts issued under those products, the interchange rates applicable to transactions on those accounts vary dynamically according to the spending history associated with each account. For example, such card products may be identified by the "BIN number", which is the first eight digits of the payment card account number.

Assuming that the payment card account to which the transaction is being charged is one for which dynamic interchange rate setting applies, then the process of FIG. 6 advances from decision block 606 to block 608. At 608 the payment card system operator computer 301 accesses the spending database 318 (FIG. 3) and more specifically, accesses the record in that database for the payment card account in question. Then, at 610, the payment card system operator computer 301 determines the currently applicable spending level for the account. This may be indicated by a suitable flag in the spending database record for the account. In some embodiments, for example, the flag may simply indicate whether, in a prior 12 month period (perhaps ending at the beginning of the current calendar quarter) there has been at least $50,000 of spending in the account. In other embodiments, the flag may indicate that the spending level was at a low, medium, high or premium level of activity. Other types of classifications of the account's spending history are possible.

Block 612 follows block 610. At block 612, and based on the determination made at 610, the payment card system operator computer 301 inserts into the authorization response an indication as to the spending history level or classification that is currently effective for the payment card account in question. Then, at 614, the payment card system operator computer 301 transmits the authorization response to the acquirer computer 104, with the spending history indication included in the authorization response. (It will be understood that the particular acquirer computer 104 to which the authorization response is sent by the payment card system operator computer 301 is the acquirer computer that sent the authorization request that prompted the authorization response.)

Considering again decision block 606, if the payment card system operator computer 301 determines that dynamic interchange rate setting is not applicable for the payment card account in question, then the process of FIG. 6 advances directly from decision block 606 to block 614, without any indication as to spending history level or classification having been inserted into the authorization response.

Figure 7A:
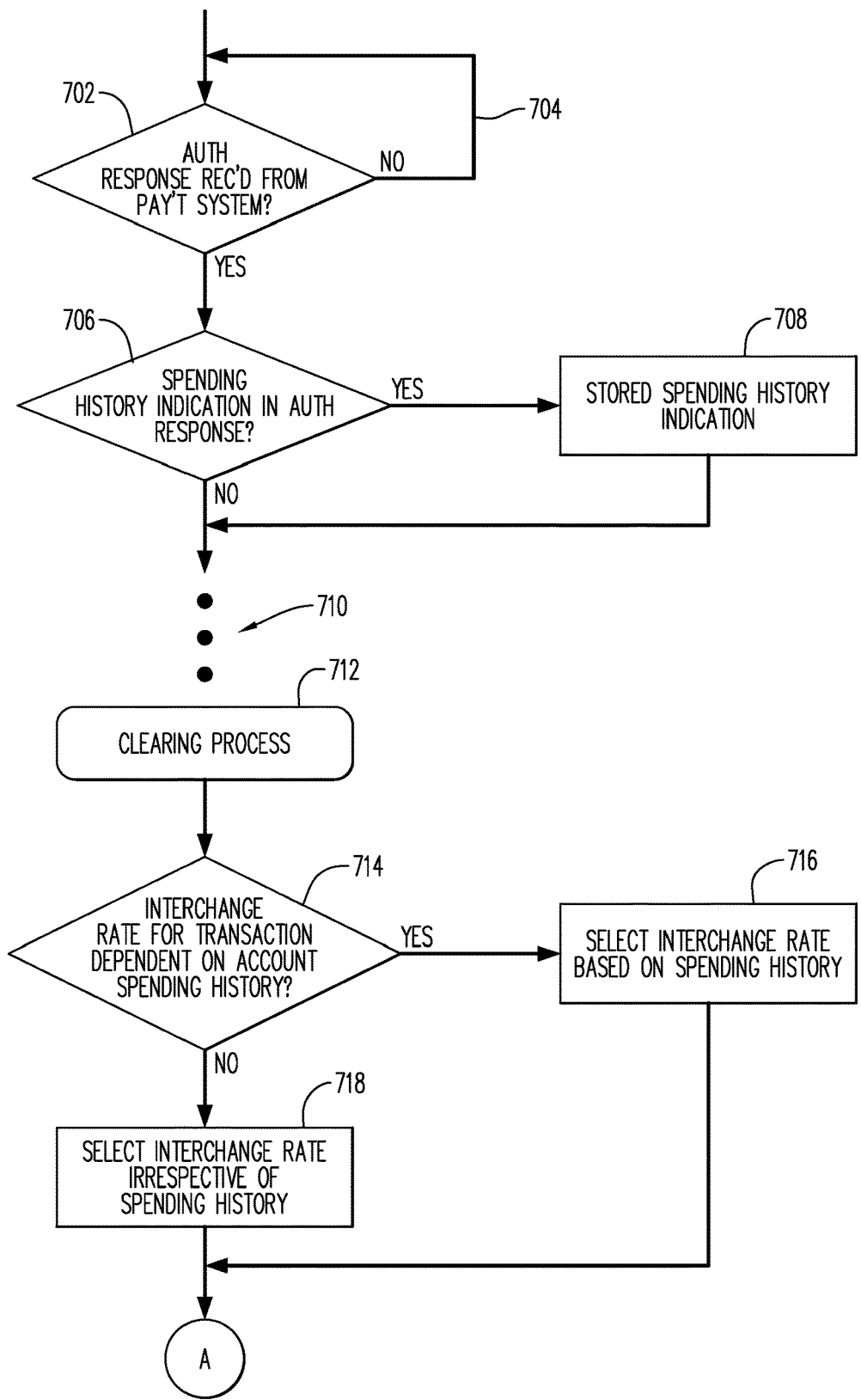
FIGS. 7A and 7B together form a flow chart that illustrates a process that may be performed in accordance with aspects of the present invention by the acquirer server computer of FIG. 4.
Figure 7B:
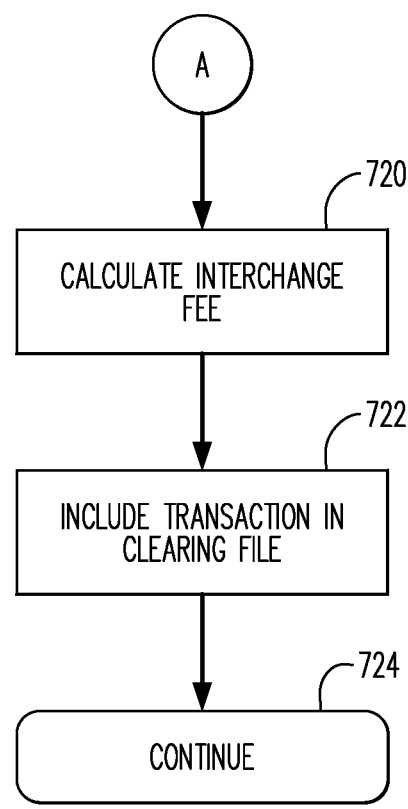

FIGS. 7A and 7B together form a flow chart that illustrates a process that may be performed in accordance with aspects of the present invention by an acquirer computer 104.

At 702 in FIG. 7A, the acquirer computer 104 determines whether it has received an authorization response from the payment processing network 106. If no authorization response is received by the acquirer computer 104, then the process of FIGS. 7A and 7B idles, as indicated by branch 704 from decision block 702. However (as in the discussion of block 602, FIG. 6) it is assumed that the authorization response is received and that it indicates that the transaction is authorized. Based on these assumptions, the process of FIGS. 7A and 7B advances from decision block 702 to decision block 706.

At decision block 706, the acquirer computer 104 determines whether the authorization response contains an indication as to the spending history status/level for the payment card account in question. If so, then block 708 follows decision block 706. At block 708, the acquirer computer 104 stores the account spending level indication as data that is relevant to interchange rate selection for the current transaction. This data may, for example, be stored in the transaction database 414 (FIG. 4).

Continuing to refer to FIG. 7A, if the acquirer computer 104 determines at decision block 706 that the authorization response received from the payment processing network 106 does not include a spending history indication, then block 708 is skipped. In either case, the acquirer computer 104 may thereafter proceed to relay the authorization response to the merchant processing system 102 which sent the authorization request so that the transaction can be completed.

Thereafter, as indicated by ellipsis 710 in FIG. 7A, a clearing process 712 takes place for the transaction, in response to the merchant processing system 102 submitting the transaction to the acquirer computer 104 as part of a clearing file. As part of the clearing process, the acquirer computer 104 determines what the interchange fee is to be for the transaction; and as a part of that function, the acquirer computer 104 determines what interchange rate from a list or database of interchange rates is applicable to the transaction. Still more specifically, and as indicated by decision block 714 (in accordance with aspects of the present invention), the acquirer computer 104 determines whether the applicable interchange rate for the transaction depends on a spending history level or status that is associated with the payment card account to which the transaction is being charged. This determination may, for example, be made by accessing information in the interchange rate database 416 (FIG. 4).

Continuing to refer to FIG. 7A, if a positive determination is made at decision block 714 (i.e., if the acquirer computer 104 determines that the applicable interchange rate is dependent on a spending history level or classification associated with the account in question), then block 716 follows decision block 714. At block 716, the acquirer computer 104 selects the interchange rate that is to be applied to the transaction based on the spending history information stored for the transaction at block 708. The selection of the interchange rate may also be based on other factors, including conventional factors such as the merchant category, the time elapsed since authorization, the card product type, the amount of the transaction, etc.

Considering again decision block 714, if a negative determination is made at that decision block, then block 718 follows decision block 714. At block 718, the acquirer computer 104 selects the applicable interchange rate for the transaction in a conventional manner, i.e., based on conventional factors and not based on a spending history level or classification associated with the payment card account to which the transaction is being charged.

Following either block 716 or block 718, as the case may be, is block 720 (FIG. 7B). At block 720, the acquirer computer 104 calculates the interchange fee for the transaction based on the interchange rate selected at block 716 or block 718. The resulting interchange fee then is included in the clearing of the transaction, as an amount held back by the issuer from the transaction amount transferred to the acquirer during clearing. Inclusion of the transaction in the clearing file submitted for clearing by the acquirer computer 104 is indicated at block 722, and the clearing process then continues in a conventional manner, as represented by block 724.

In some embodiments of the invention, a different interchange rate may be applied to transactions effected with "high spending" accounts (according to how the threshold would be defined) than for similar transactions charged to lower spending accounts of the same type of card product. For example, an interchange rate of 2.3% could be applicable to the former category of transactions, with an interchange rate of 2.0% applicable to the latter category of transactions.

With a dynamic interchange setting mechanism as described in the preceding paragraph, issuers automatically receive the benefits of a higher interchange rate for transactions undertaken by high-spending payment card accounts, without the issuers being required to change the card product issued to the high-spending cardholders. This feature rewards issuers for increasing the value of the network, including for merchants, by attracting high-spending cardholders and for promoting use of the cards issued to those cardholders. This may give issuers incentives to enhance rewards programs for the high-spending cardholders, and may also provide incentives for the issuers to promote and issue premium card products.

Further, the increased interchange rate applied to purchases by high-spending individuals may be more attractive to merchants because of the increased revenues they stand to gain by having the high-spending cardholders as their customers.

According to aspects of the invention, the spending history upon which the determination of an interchange rate depends may be for an individual payment card account or for a group of payment card accounts, such as all accounts held within a household or all accounts held by a group of business partners. A spending history should be understood to be "associated with" a payment card account if the spending history in question reflects spending by the payment card account in question or by a group of payment card accounts that includes the payment card account in question. A spending history used to determine an applicable interchange rate may be based on total spending by an account or group of accounts, or may be based on a subset of total spending, such as spending with a particular merchant or category of merchants or by industry.

According to aspects of the present invention, spending histories may be compiled based on periods of time of different durations than a 12-month period. Spending histories may be compiled with a frequency other than quarterly.

It will be understood that "quarterly" refers to performing a function at a timing that corresponds to calendar quarters.

Principles of the present invention are applicable to business and fleet payment card accounts as well as to payment card accounts used primarily for personal, family or household purposes.

In embodiments described above, the acquirer is provided with the spending history indication via an authorization response. Alternatively, however, a message from the payment card system operator other than the authorization response may be used to provide the spending history indication to the acquirer.

The above description and/or the accompanying drawings are not meant to imply a fixed order or sequence of steps for any process referred to herein; rather any process may be performed in any order that is practicable, including but not limited to simultaneous performance of steps indicated as sequential.

Those who are skilled in the art will appreciate the distinction between an "interchange fee" and an "interchange rate". The former is a dollar amount of a fee that is charged to an acquirer for a particular transaction and is calculated by applying the latter (the "interchange rate") to the transaction amount (in the case where the interchange rate is at least partially expressed in percentage terms). Thus the interchange rate may be at least partially expressed in terms of "percentage points", where for example 1.7% is 1.7 percentage points, 1.9% is 1.9 percentage points, etc., and 1.7 is a different number of percentage points from 1.9.

It will also be understood that "transaction amount" refers to the dollar (or other currency) amount that is to be charged to a payment card account in connection with a particular purchase or other transaction in a payment card system.

The terms "payment card account" and "payment account" may be used interchangeably herein. Also, the term "payment transaction" may be used as a synonym for a purchase or other transaction carried out in a payment card system. A payment card account number is an example of a payment account identifier.

As used herein and in the appended claims, the term "payment card system account" includes: (i) a credit card account or (ii) a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, stored value card, prepaid card, charge card, corporate card, fleet card, or any similar device or number used by cardholders in connection with payment transactions.

As used herein and in the appended claims, the term "payment card system" refers to a system for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for dynamically determining interchange fees comprising:
   transmitting, by an acquirer computer to a payment processing network, a payment card account authorization request comprising a payment card account number and a total transaction amount associated with a transaction;
   receiving, by the acquirer computer from the payment processing network, an authorization response authorizing the transaction and comprising a spending history indication reflecting a compilation of spending history data of a group of payment card accounts that qualify for dynamic interchange rate setting, the group of payment card accounts including the payment card account number;
   storing, by the acquirer computer in a transaction database, the spending history indication;
   transmitting, by the acquirer computer to a merchant processing system computer, the authorization response;
   receiving, by the acquirer computer from the merchant processing system computer, a clearing file comprising transaction information and the payment card account number;
   determining, by the acquirer computer, that an interchange rate for the transaction depends on the spending history indication;
   selecting, by the acquirer computer, an interchange rate for the transaction from an interchange rate selection database based on the spending history indication;
   calculating, by the acquirer computer, an interchange fee for the transaction based on the interchange rate; and
   transmitting, by the acquirer computer to the payment network, the clearing file and the interchange fee for clearing of the transaction.

2. The method of claim 1, further comprising receiving, by the acquirer computer from the payment network, a transaction amount for the transaction that equals the total transaction amount less the interchange fee.

3. The method of claim 1, wherein the spending history indication comprises a cumulative total of transaction amounts of a plurality of transactions charged to the group of payment card accounts during a predetermined time period.

4. The method of claim 1, wherein the spending history indication is determined quarterly.

5. The method of claim 1, wherein the spending history indication is calculated for the group of payment card accounts based at least in part on a total amount spent in a preceding twelve-month period.

6. The method of claim 1, wherein the spending history indication is determined based on at least one of an amount of spending by the group of payment card accounts with a particular merchant, and an amount of spending by the group of payment card accounts with a particular class of merchants.

7. A system comprising:
   a payment processing network;
   an acquirer computer operably connected to the payment processing network;
   a transaction database operably connected to the acquirer computer;
   an interchange rate selection database operably connected to the acquirer computer; and
   a merchant processing system computer operably connected to the acquirer computer;
   wherein the acquirer computer comprises a processor and a memory in communication with the processor, and wherein the memory stores program instructions operative to instruct the processor to:
      transmit a payment card account authorization request to a payment processing network for a transaction, the payment card account authorization request comprising a payment card account number and a total transaction amount associated with a transaction;
      receive an authorization response from the payment processing network, the authorization response authorizing the transaction and comprising a spending history indication reflecting a compilation of spending history data of a group of payment card accounts that qualify for dynamic interchange rate setting, the group of payment card accounts including the payment card account number;
      store the spending history indication in the transaction database;
      transmit the authorization response to the merchant processing system computer;
      receive a clearing file from the merchant processing system computer, the clearing file comprising the payment card account number;
      determine that an interchange rate for the transaction depends on the spending history indication;
      select an interchange rate for the transaction from the interchange rate selection database based on the spending history indication;
      calculate an interchange fee for the transaction based on the interchange rate; and
      transmit the clearing file and the interchange fee to the payment network for clearing of the transaction.

8. The system of claim 7, wherein the memory stores further program instructions operative to instruct the processor to receive a transaction amount for the transaction from the payment network, the transaction amount equaling the total transaction amount less the interchange fee.

9. The system of claim 7, wherein the spending history indication comprises a cumulative total of transaction amounts of a plurality of transactions charged to the group of payment card accounts during a predetermined time period.

10. The system of claim 7, wherein the spending history indication is determined quarterly.

11. The system of claim 7, wherein the spending history indication is calculated for the group of payment card accounts based at least in part on a total amount spent in a preceding twelve-month period.

12. The system of claim 7, wherein the spending history indication is determined based on at least one of an amount of spending by the group of payment card accounts with a particular merchant, and an amount of spending by the group of payment card accounts with a particular class of merchants.

\* \* \* \* \*